(12) United States Patent
Ramasubramanian

(10) Patent No.: US 9,712,610 B2
(45) Date of Patent: Jul. 18, 2017

(54) SYSTEM AND METHOD FOR INCREASING PHYSICAL MEMORY PAGE SHARING BY WORKLOADS

(71) Applicant: VMWARE, INC., Palo Alto, CA (US)

(72) Inventor: Manikandan Ramasubramanian, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 517 days.

(21) Appl. No.: 14/042,774

(22) Filed: Oct. 1, 2013

(65) Prior Publication Data

US 2015/0095446 A1   Apr. 2, 2015

(51) Int. Cl.
*G06F 15/167* (2006.01)
*H04L 29/08* (2006.01)

(52) U.S. Cl.
CPC ...... *H04L 67/1023* (2013.01); *H04L 67/1008* (2013.01)

(58) Field of Classification Search
CPC .................. H04L 67/1008; H04L 67/1023
See application file for complete search history.

(56) References Cited

U.S. PATENT DOCUMENTS

| | | | | |
|---|---|---|---|---|
| 6,829,637 | B2 * | 12/2004 | Kokku | H04L 29/06 709/201 |
| 2009/0204718 | A1 * | 8/2009 | Lawton | G06F 9/5077 709/230 |
| 2010/0107159 | A1 * | 4/2010 | Radhakrishnan | G06F 9/5055 718/1 |
| 2012/0131259 | A1 * | 5/2012 | Baskakov | G06F 12/109 711/6 |
| 2012/0239850 | A1 * | 9/2012 | Qiu | G06F 12/10 711/6 |
| 2012/0254860 | A1 * | 10/2012 | Bozek | G06F 9/461 718/1 |
| 2013/0275708 | A1 * | 10/2013 | Doi | G06F 9/4856 711/165 |

* cited by examiner

*Primary Examiner* — June Sison
*Assistant Examiner* — Dixon Dabipi

(57) ABSTRACT

System and method for increasing physical memory page sharing by workloads executing on different host computing systems are described. In one embodiment, workloads executing on different host computing systems that access physical memory pages having identical contents are identified. Further, migration to consolidate the identified workloads on a single host computing system such that the physical memory pages can be shared using a page sharing mechanism is recommended.

28 Claims, 5 Drawing Sheets

SYSTEM AND METHOD FOR INCREASING PHYSICAL MEMORY PAGE SHARING BY WORKLOADS

TECHNICAL FIELD

The present disclosure relates generally to virtual machines and, more particularly, to methods, techniques, and systems for sharing physical memory pages across workloads (e.g., virtual machines) running on different host computing systems in a virtualized computing environment.

BACKGROUND

Computer virtualization is a technique that involves encapsulating a representation of a physical computing machine platform into a virtual machine (VM) that is executed under the control of virtualization software running on hardware computing platforms (also referred to herein as "host computing systems" or "servers"). A group of hardware computing platforms may be organized as a cluster to provide the hardware resources, such as memory, central processing units (CPUs) and so on, for VMs/workloads.

Typically the architected address space of a CPU is much larger than the physical memory provided in a computer system. It is known in the art to map memory pages from the virtual architected address space to physical memory. Memory pages of the virtual address space are known as virtual memory pages. Further, memory pages of physical memory are known as physical memory pages. Both virtual and physical memory pages are referenced by page numbers, so a virtual page number may be referred to as a VPN, and a physical page number may be referred to as a PPN. Typically VPNs are mapped to PPNs, but VPN address space may also be swapped out to persistent storage, and managed using other mechanism known in the art.

In a virtualized computing environment a second level of mapping is required. Logically, the VPN within a guest is mapped twice in order to determine which physical memory page of the hardware memory is to be accessed. The first mapping may be provided by the guest operating system (OS) running inside the VM, which translates the guest VPN (GVPN) into a corresponding guest PPN (GPPN). The second mapping may be provided by taking the GPPN used by the guest OS and mapping it to a hardware PPN that can be used to address the physical memory. As is known in the art, it is possible to condense these mappings via a shadow page table. It is also known in the art for CPUs to provide hardware support for multiple mappings by providing nested page tables.

Multiple VMs may have physical memory pages having identical content, particularly for program and OS code. For example, if multiple VMs are running the same guest OS, the same portions of the OS code may be resident in physical memory pages at the same time for execution within different VMs. Thus, for a particular page of OS code, there may be multiple copies of portions of the OS code stored in multiple host computing systems.

To reduce memory overhead, existing methods can reclaim physical memory pages having identical contents, leaving only a single copy of the physical memory page to be shared by the multiple VMs. This is known in the art as transparent memory sharing, and is achieved by changing the GPPN to hardware PPN memory mappings for the VMs having physical memory pages with identical contents to point to the same physical memory page.

Figure 1:
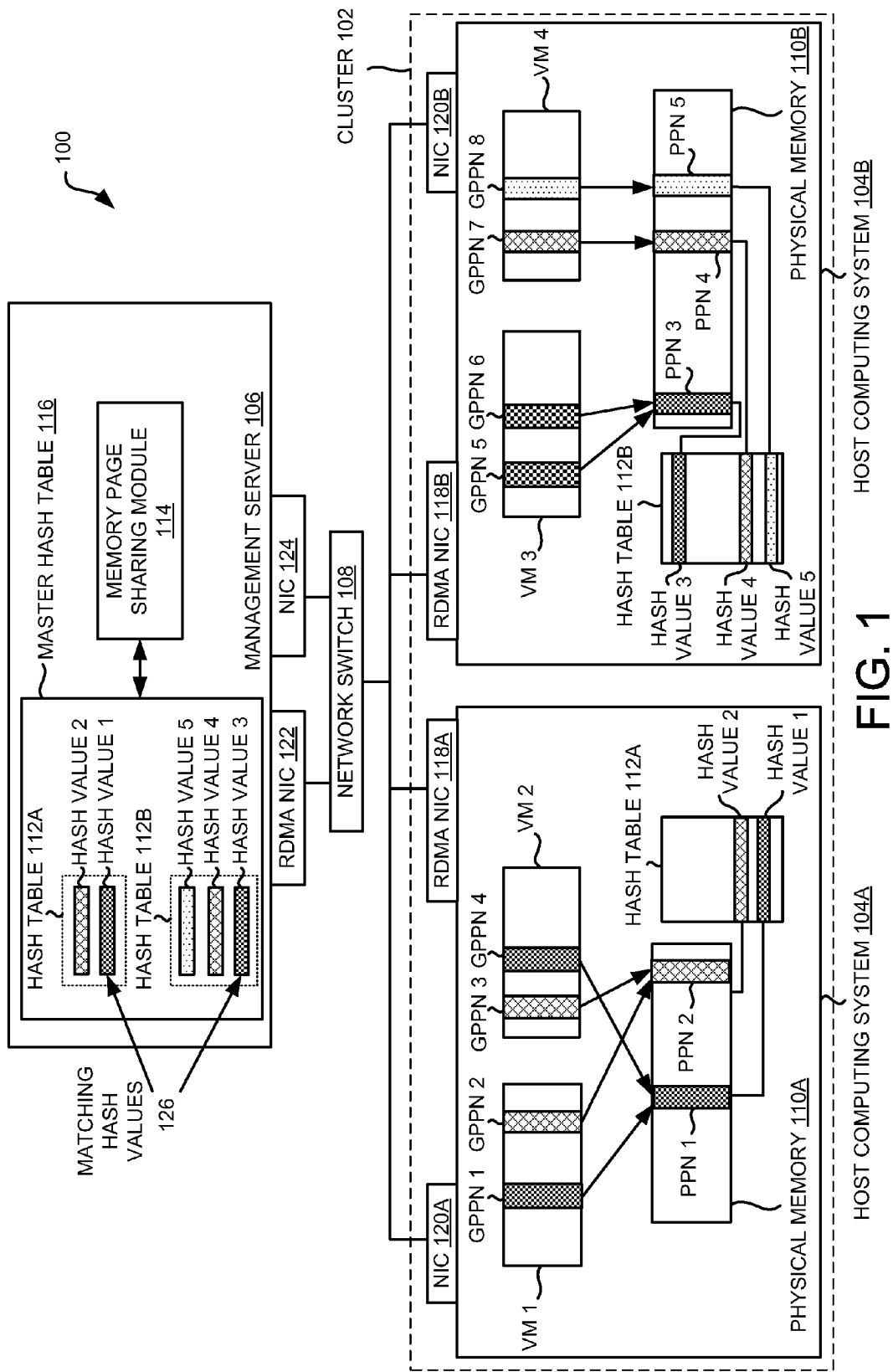
FIG. 1 is an example system view of a virtualized computing environment illustrating determining identical physical memory pages across workloads running on different host computing systems.

The drawings described herein are for illustration purposes only and are not intended to limit the scope of the present subject matter in any way.

DETAILED DESCRIPTION

Embodiments described herein provide enhanced computer-based and network-based methods, techniques, and systems for physical memory page sharing across workloads (e.g., virtual machines (VMs)) running on multiple host computing systems in a virtualized computing environment. The term "virtualized computing environment" is used herein to refer to a physical infrastructure that hosts a virtual infrastructure comprising virtual objects such as VMs, virtual data centers (VDCs), and virtual appliances (vApps). In the present invention, the address space of hardware memory includes physical memory pages referenced by physical page numbers (PPNs), however, it can be noted that any other memory units such as blocks, regions, or other analogous allocation units can also be used.

The terms "hardware memory", "physical memory" and "host physical memory" are used interchangeably throughout the document and these terms refer to memory that is available on a host computing system. The term "guest physical memory" refers to memory that is visible to a guest operating system (OS) running in a VM. Further, a virtualization layer (e.g., hypervisor) provides a mapping from the guest physical memory to the host physical memory. The term "guest virtual memory" refers to the virtual memory that is managed by a guest OS.

In a cluster with multiple workloads (e.g., VMs) running on multiple host computing systems, there can be some workloads running the same OS and/or the same applications. The examples disclosed below identify workloads that use physical memory pages having identical contents but reside on different host computing systems, and trigger migration (e.g., live migration) of the workloads to the same host computing system to maximize transparent memory sharing. For example, when the contents of physical memory pages associated with a VM running on a first host computing system match the contents of physical memory pages of a second host computing system, the VM can be migrated to the second host computing system and the hardware physical memory pages can be shared for the migrated VM on the second host computing system using existing transparent memory sharing techniques.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

FIG. 1 is example system view 100 of a virtualized computing environment illustrating determining identical physical memory pages across workloads (e.g., VMs) running on different host computing systems. Particularly, FIG. 1 illustrates cluster 102 communicative with management server 106 via network switch 108. The term "network switch" is used in the following description, however, in the present invention it is used broadly to refer to any network device capable of routing/carrying the network traffic such as routers, switches, multi-function devices having a routing function, edge gateways, and so on. In the example shown in FIG. 1, cluster 102 is described using two host computing systems 104A and 104B, however, any number of host computing systems can be configured in cluster 102.

Further, host computing system 104A executes VM 1 and VM 2 and host computing system 104B executes VM 3 and VM 4. During execution, an application running in VMs generates load and stores requests targeting a guest virtual address space, organized as guest virtual memory pages. A request to a guest virtual memory page within the guest virtual address space may be mapped to a corresponding guest physical page number (GPPN) of guest physical memory.

Furthermore, host computing systems 104A and 104B include physical memories 110A and 110B, respectively, which are organized into physical memory pages. Further, a GPPN may map to a PPN of a physical memory of a host computing system. In a host computing system, more than one GPPN may map to a common PPN, which, as discussed above, is known in the art as transparent memory sharing.

In the example shown in FIG. 1, the address space of physical memory 110A includes physical memory pages PPN 1 and PPN 2, and the address space of physical memory 110B includes physical memory pages PPN 3, PPN 4, and PPN 5. Further, host computing system 104A executes VM 1 and VM 2. VM 1 includes guest physical memories GPPN 1 and GPPN 2 and VM 2 includes guest physical memories GPPN 3 and GPPN 4. In host computing system 104A, GPPN 1 and GPPN 4 map to PPN 1 and GPPN 2 and GPPN 3 map to PPN 2. Similarly, host computing system 104B executes VM 3 and VM 4. Further, VM 3 includes guest physical memories GPPN 5 and GPPN 6 and VM 4 includes guest physical memories GPPN 7 and GPPN 8. In host computing system 104B, GPPN 5 and GPPN 6 map to PPN 3, GPPN 7 maps to PPN 4, and GPPN 8 maps to PPN 5. The drawings described herein are for illustration purposes only and are not intended to limit the scope of the present subject matter in any way.

Further, host computing systems 104A and 104B include hash tables 112A and 112B, respectively. Hash table 112A contains hash value 1 and hash value 2 that are generated based on contents of physical memory pages PPN 1 and PPN 2, respectively. Similarly, hash table 112B contains hash value 3, hash value 4, and hash value 5 that are generated based on contents of physical memory pages PPN 3, PPN 4, and PPN 5, respectively. For example, the hash values are periodically generated by applying a hash function on contents of the physical memory pages of host computing systems 104A and 104B and then the hash values are updated in a respective one of hash tables 112A and 112B.

Furthermore, management server 106 includes memory page sharing module 114 and master hash table 116. One skilled in the art can appreciate that memory page sharing module 114 can also be provided in a VM or virtual application that can run on any host computing system and can be provided to a user through a graphical user interface as a part of management software. In operation, memory page sharing module 114 periodically synchronizes hash tables 112A and 112B with master hash table 116. In one example, memory page sharing module 114 periodically polls host computing systems 104A and 104B to obtain the hash values stored in hash tables 112A and 112B, respectively, using a connection and then periodically synchronizes hash tables 112A and 112B with master hash table 116 using the obtained hash values. In this case, memory page sharing module 114 polls host computing systems 104A and 104B and obtains the hash values stored in hash tables 112A and 112B via a remote direct memory access (RDMA)-enabled network connection. For example, RDMA-enabled network connection is a mechanism by which remote memory (i.e., physical memories 110A and 110B) can be included in local address space of management server 106 via a RDMA network interface card (NIC) (i.e., RDMA NIC 122 associated with management server 106 and RDMA NICs 118A and 118B associated with host computing systems 104A and 104B, respectively).

In one embodiment, memory page sharing module 114 identifies hash values corresponding to VM 3 and then compares each hash value corresponding to VM 3 with the hash values in hash table 112A using master hash table 116. In the example shown in FIG. 1, memory page sharing module 114 compares hash value 3 corresponding to VM 3 with hash value 1 and hash value 2 in hash table 112A of master hash table 116. In the example shown in FIG. 1, the PPNs of physical memory pages with identical content are shown by similar pattern. As shown by arrows 126 in FIG. 1, hash value 3 matches with hash value 1 in hash table 112A. Then, memory page sharing module 114 performs a full comparison of the physical memory page contents associated with hash value 3 and hash value 1 to exclude a false match. In other words, a byte-by-byte or word-by-word comparison of contents of PPN 1 and PPN 3 associated with the matched hash values (i.e., hash value 1 and hash value 3, respectively) is performed. Once the content of physical memory page PPN 1 is confirmed to match the content of physical memory page PPN 3, then memory page sharing module 114 recommends migration (e.g., live migration) of VM 3 to host computing system 104A as explained in detail in FIG. 2.

Figure 2:
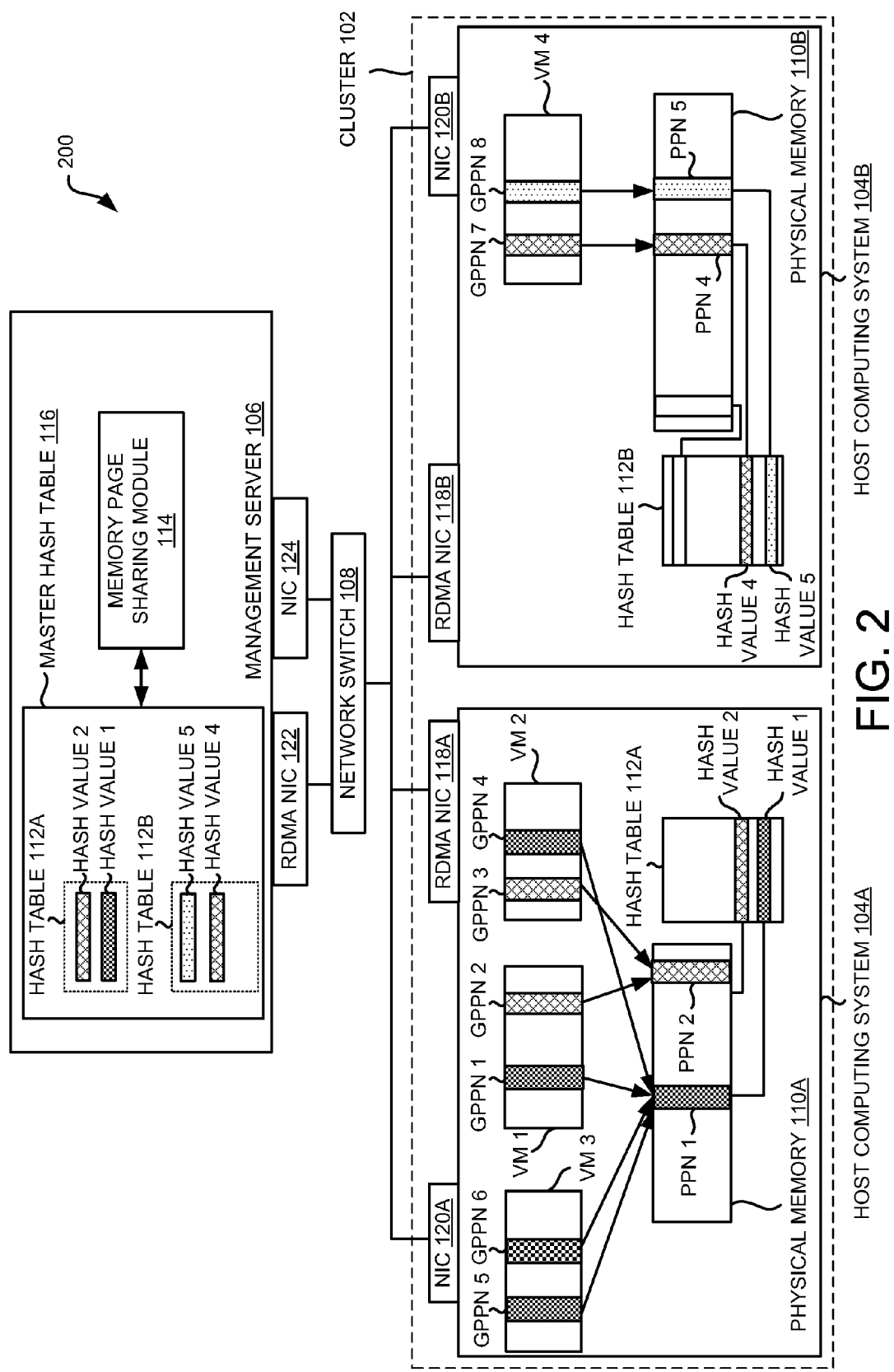
FIG. 2 is an example system view of a virtualized computing environment illustrating migration of a workload to other host computing system having the identical physical memory page.

FIG. 2 is an example system view 200 of a virtualized computing environment illustrating migration of VM 3 to host computing system 104A. Note that the contents of physical memory page PPN 1 of host computing system 104A are identical to the contents of physical memory page PPN 3 of host computing system 104B. In one embodiment, the matched hash values corresponding to VM3 are propagated to hash table 112A residing in host computing system 104A during live migration of VM3. In this case, propagating the matched hash values corresponding to VM3 identified at management server 106 provides immediate memory sharing and reduces the memory requirements needed for the live migration.

In the example shown in FIG. 2, VM 3 is migrated from host computing system 104B to host computing system 104A. Upon migration of VM 3 to host computing system 104A, physical memory page PPN 1 is shared for migrated VM 3 on host computing system 104A using existing transparent memory sharing techniques. In this case, GPPN 5 and GPPN 6 of VM 3 are mapped to PPN 1 in host computing system 104A. Once VM 3 is migrated, the redundant copy of PPN 3 in host computing system 104B can be reclaimed and hence the total consumption of physical memory 110B can be reduced.

In this case, migration of VM 3 to host computing system 104A is initiated based on computing resources availability at host computing system 104A. A resource scheduling framework can manage allocation and de-allocation of computing resources (e.g., CPU, memory and so on) to migrated VM 3 via NICs (i.e., NIC 124 and NICs 120A and 120B associated with management server 116 and host computing systems 104A and 104B, respectively).

In another example, VM 4 includes guest physical memories GPPN 7 and GPPN 8 that are mapped to physical memory pages PPN 4 and PPN 5, respectively. Memory page sharing module 114 compares hash value 4 and hash value 5 corresponding to VM 4 with hash value 1 and hash value 2 in hash table 112A of master hash table 116. As shown in FIG. 1, hash value 4 matches with hash value 2 in hash table 112A of master hash table 116. However, hash value 5 does not match with any hash value in hash table 112A of master hash table 116. Since all the physical memory pages (i.e., PPN 4 and PPN 5) corresponding to VM 4 are not identical to the physical memory pages of host computing system 104A, memory page sharing module 114 does not take any action for VM 4 and repeats the process for other VMs in host computing system 104B.

Figure 3:
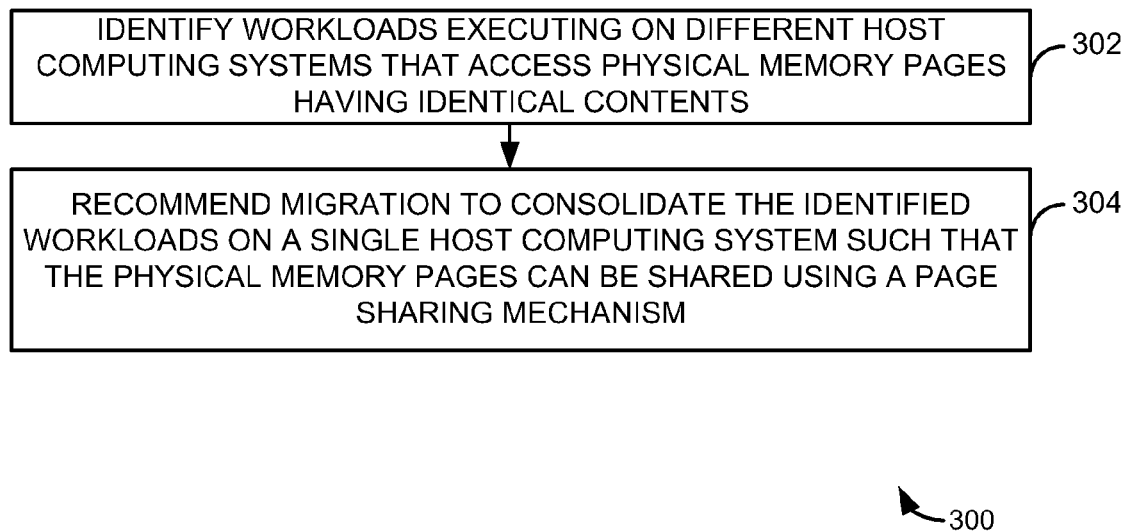
FIG. 3 illustrates example flow diagram for creating a workload migration recommendation in a virtualized computing environment.

FIG. 3 illustrates example flow diagram 300 for creating a workload migration recommendation in a virtualized computing environment. At step 302, workloads executing on different host computing systems that access physical memory pages having identical contents are identified. At step 304, migration to consolidate the identified workloads on a single host computing system such that the physical memory pages can be shared using a page sharing mechanism is recommended. This process is explained in more detail in FIG. 4.

Figure 4:
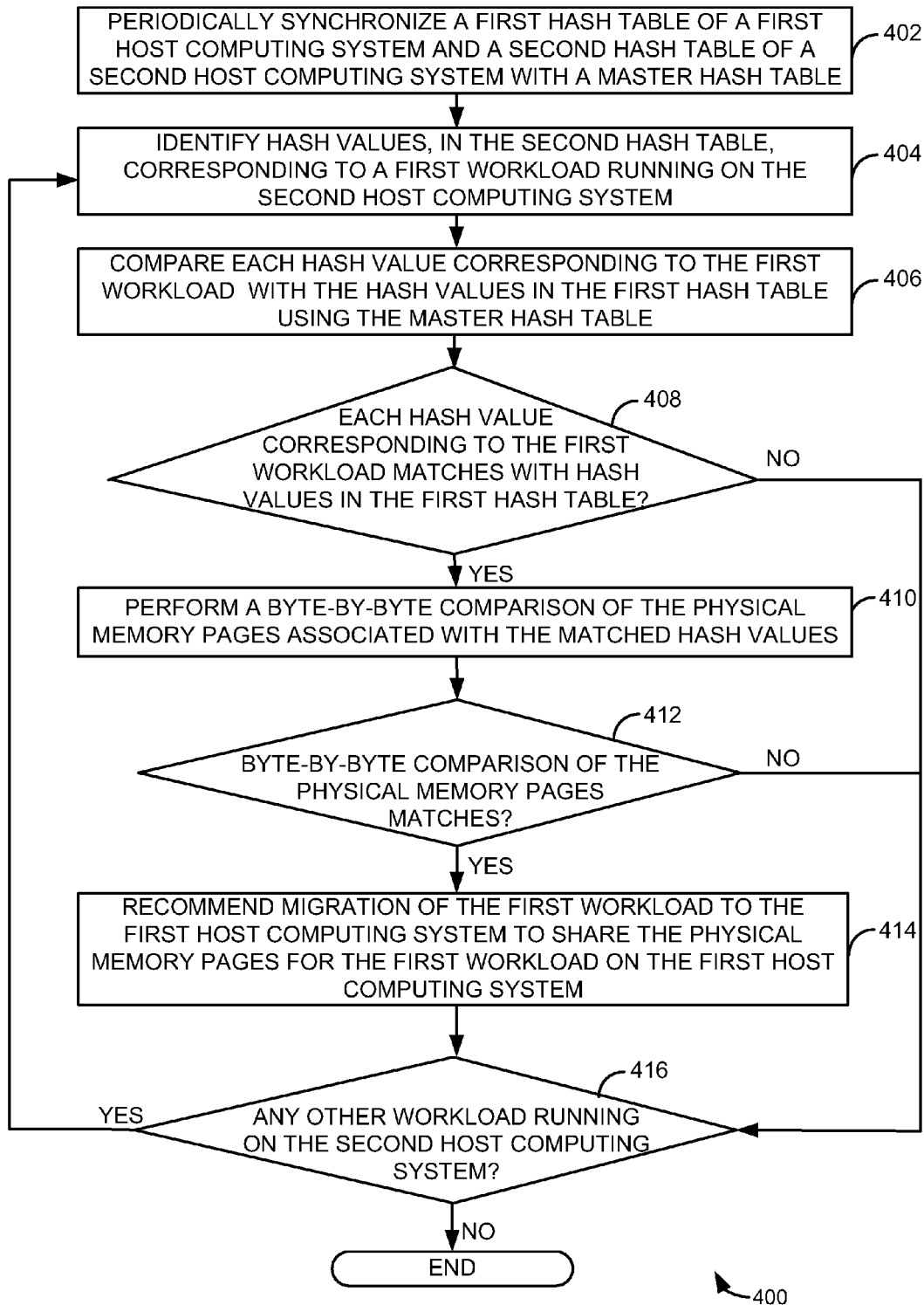
FIG. 4 illustrates an example flow diagram for physical memory page sharing across workloads running on multiple host computing systems.

FIG. 4 illustrates example flow diagram 400 for physical memory page sharing across VMs residing on a first host computing system and a second host computing system. The first host computing system and the second host computing system include a first hash table and a second hash table, respectively. Further, the first hash table and the second hash table include hash values corresponding to contents of physical memory pages of the first host computing system and the second host computing system, respectively. For example, the hash values are periodically generated by applying a hash function on the contents of the physical memory pages of the first host computing system and the second host computing system and then the hash values are updated in a respective one of the first hash table and the second hash table.

At step 402, the first hash table and the second hash table are periodically synchronized with a master hash table residing in a management server. In one example, the management server periodically polls the first host computing system and the second host computing system to obtain the hash values stored in the first hash table and the second hash table using a connection (e.g., a remote direct memory access (RDMA)-enabled network connection or a host bus interconnect hardware), and then periodically synchronizes the first hash table and the second hash table with the master hash table using the obtained hash values.

At step 404, hash values corresponding to a first workload running on the second host computing system are identified in the second hash table using the master hash table. At step 406, each hash value corresponding to the first workload in the second hash table is compared with the hash values in the first hash table using the master hash table. At step 408, a check is made to determine whether each hash value corresponding to the first workload matches with hash values in the first hash table. At step 410, byte-by-byte comparison of the physical memory pages associated with the matched hash values in the first hash table and the second hash table is performed when each hash value corresponding to the first workload matches with hash values in the first hash table. In this case, byte-by-byte comparison of the PPNs associated with the first workload and the PPNs associated with the matched hash values in the first hash table is performed.

At step 412, a check is made to determine whether byte-by-byte comparison of the PPNs associated with the first workload matches with the PPNs associated with the matched hash values in the first hash table. At step 414, migration (e.g., live migration) of the first workload to the first host computing system is recommended when byte-by-byte comparison of the PPNs associated with the first workload matches with the PPNs associated with the matched hash values in the first hash table. In this case, the migration of the first workload to the first host computing system is initiated based on computing resources availability at the first host computing system. Upon migration, the PPNs are shared for the first workload on the first host computing system. In this case, the PPNs are shared for the first workload by mapping GPPNs of the first workload to the PPNs associated with the matched hash values in the first host computing system. At step 416, a check is made to determine whether any other workload running on the second host computing system. If any other workload is running on the second host computing system, then the steps 404-414 are repeated for a next workload. The steps 404-416 are repeated for all the workloads running on the second host computing system.

In various embodiments, the systems and methods described in FIGS. 1 through 4 provides migration the same workloads across the host computing systems to free up more memory on the native host computing system. Further, redundant workloads across the host computing systems can be converged into a few host computing systems and can be load balanced. Since RDMA NIC is used for page comparison, CPU cycles can be utilized for other operations.

Figure 5:
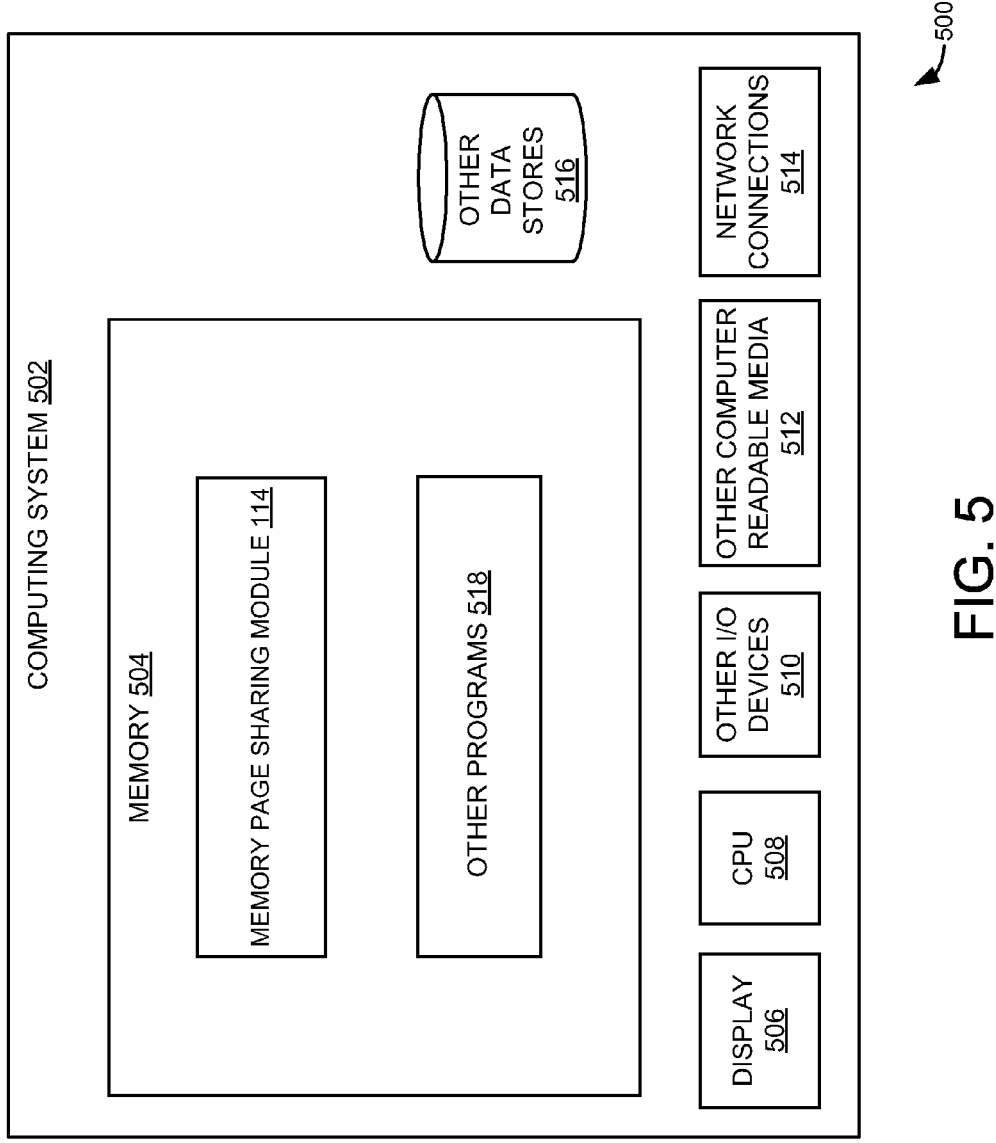
FIG. 5 is a block diagram of an example physical computing system including a memory page sharing module, according to an example embodiment.

FIG. 5 is block diagram 500 of an example physical computing system 502 (e.g., management server 106 shown in FIGS. 1-2) including a memory page sharing module 114 according to an example embodiment. In particular, FIG. 5 shows a computing system 502 that may be utilized to implement memory page sharing module 114. Note that one or more general purpose virtual or physical computer systems suitably instructed may be used to implement memory page sharing module 114. In addition, computing system 502 may comprise one or more distinct computing systems/devices and may span distributed locations.

In the embodiment shown, computing system 502 may comprise computer memory ("memory") 504, display 506, one or more Central Processing Units ("CPU") 508, input/ output devices 510 (e.g., keyboard, mouse, etc.), other computer-readable media 512, and network connections 514. Memory page sharing module 114 is shown residing in memory 504. The components of memory page sharing module 114 may execute on one or more CPUs 508 and implement techniques described herein. Other code or programs 518 (e.g., an administrative interface, a Web server, and the like) may also reside in memory 504, and execute on one or more CPUs 508. Further, other data repositories, such as data store 516, may also reside in computing system 502. One or more of the components in FIG. 5 may not be present in any specific implementation. For example, some embodiments may not provide other computer readable media 512 or display 506.

Memory page sharing module 114 interacts via network with host computing systems in the cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of memory page sharing module 114, such as in data store 516, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of memory page sharing module 114 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The invention claimed is:

1. A method of creating a workload migration recommendation comprising:
comparing each hash value, in a second hash table of a second host computing system, corresponding to a first workload running on the second host computing system with hash values in a first hash table of a first host computing system by a processor;
identifying the first workload as accessing physical memory pages having identical contents by the processor when each hash value corresponding to the first workload running on the second host computing matches with the hash values in the first hash table of the first host computing system; and
recommending migration of the identified first workload from the second host computing system to the first host computing system by the processor such that the physical memory pages can be shared for the first workload on the first host computing system.

2. The method of claim 1, comparing each hash value corresponding to the first workload running on the second host computing system with hash values in the first hash table, comprises:
periodically synchronizing the first hash table of the first host computing system and the second hash table of the second host computing system with a master hash table residing in a management server, wherein the first hash table and the second hash table comprise hash values that are generated based on contents of the physical memory pages; and
comparing each hash value, in the second hash table, corresponding to the first workload running on the second host computing system with the hash values in the first hash table using the master hash table.

3. The method of claim 1, further comprises:
propagating the hash values corresponding to the first workload to the first hash table residing in the first host computing system during migration of the identified first workload.

4. The method of claim 1, further comprising:
repeating the steps of comparing, identifying, and recommending for other workloads running on the second host computing system.

5. The method of claim 1, wherein sharing the physical memory pages for the first workload on the first host computing system, comprises:
mapping guest physical memory pages of the first workload to the physical memory pages associated with the matched hash values in the first host computing system.

6. The method of claim 1, further comprising initiating the migration of the first workload to the first host computing system based on computing resources availability at the first host computing system.

7. The method of claim 1, wherein identifying the first workload as accessing the physical memory pages having identical contents further comprises:
performing, a byte-by-byte comparison of the physical memory pages associated with the matched hash values in the first hash table and the second hash table; and
identifying the first workload as accessing the physical memory pages having identical contents based on outcome of the byte-by-byte comparison.

8. The method of claim 1, further comprising:
periodically generating the hash values by applying a hash function on the contents of the physical memory pages of the first host computing system and the second host computing system; and updating the hash values in a respective one of the first hash table and the second hash table.

9. The method of claim 2, wherein periodically synchronizing the first hash table of the first host computing, system and the second hash table of the second host computing system with the master hash table residing in the management server, comprises:
periodically polling, the first host computing system and the second host computing system to obtain the hash values stored in the first hash table and the second hash table using a connection; and
periodically synchronizing the first hash table and the second hash table with the master hash table using the obtained hash values.

10. The method of claim 9, wherein the connection comprises at least one of a remote direct memory access (RDMA)-enabled network connection and a host bus interconnect hardware.

11. A system comprising:
a plurality of host computing systems comprising a first host computing system and a second host computing system; and
a management server communicatively coupled to the plurality of host computing systems, wherein the management server comprises;
at least one processor;
memory coupled to the at least one processor, wherein the memory comprises a memory page sharing module having instructions that are executed by the at least one processor to:
compare each hash value, in a second hash table of the second host computing system, corresponding to a first workload running on the second host computing system with hash values in a first hash table of the first host computing system;
identify the first workload as accessing the physical memory pages having identical contents when each hash value corresponding to the first workload running on the second host computing system matches with the hash values in the first hash table of the first host computing system; and
recommend migration of the identified first workload from the second host computing system to the first host computing system such that the physical memory pages can be shared for the first workload on the first host computing system.

12. The system of claim 11, wherein the management server further comprises a master hash table, and wherein the memory page sharing module is configured to:
periodically synchronize the first hash table of the first host computing system and the second hash table of the second host computing system with the master hash table, wherein the first hash table and the second hash table comprise hash values that are generated based on contents of physical memory pages; and
compare each hash value, in the second hash table, corresponding to the first workload running on the second host computing system with the hash values in the first hash table using the master hash table.

13. The system of claim 11, wherein the memory page sharing module is configured to:
propagate the hash values corresponding to the first workload to the first hash table residing in the first host computing system during migration of the identified first workload.

14. The system of claim 11, wherein the memory page sharing module is further configured to repeat the steps of comparing, identifying and recommending for other workloads running on the second host computing system.

15. The system of claim 11, wherein the memory page sharing module shares the physical memory pages for the first workload on the first host computing system by mapping guest physical memory pages of the first workload to the physical memory pages associated with the matched hash values in the first host computing system.

16. The system of claim 11, further comprising a resource scheduling framework to initiate migration of the first workload to the first host computing system based on computing resources availability at the first host computing system.

17. The system of claim 11, wherein the memory page sharing module identifies the first workload as accessing the physical memory pages having identical contents by performing a byte-by-byte comparison of the physical memory pages associated with the matched hash values in the first hash table and the second hash table.

18. The system of claim 12, wherein the memory page sharing module periodically polls the first host computing system and the second host computing system to obtain the hash values stored in the first hash table and the second hash table using a connection, and periodically synchronizes the first hash table and the second hash table with the master hash table using the obtained hash values.

19. The system of claim 18, the connection comprises at least one of a remote direct memory access (RDMA)-enabled network connection and a host bus interconnect hardware.

20. A non-transitory computer-readable storage medium including instructions that are configured, when executed by a computing system, to perform a method of creating a workload migration recommendation, the method comprising:
comparing each hash value, in a second hash table of a second host computing system, corresponding to a first workload running on the second host computing system with hash values in a first hash table of a first host computing system; and
identifying the first workload as accessing physical memory pages having identical contents when each hash value corresponding to the first workload running on the second host computing system matches with the hash values in the first hash table of the first host computing system; and
recommending migration of the identified first workload from the second host computing system to the first host computing system such that the physical memory pages can be shared for the first workload on the first host computing system.

21. The non-transitory computer-readable storage medium of claim 20, wherein comparing each hash value corresponding to the first workload running on the second host computing system with hash values in the first hash table, comprises:
periodically synchronizing the first hash table of the first host computing system and the second hash table of the second host computing system with a master hash table residing in a management server, wherein the first hash table and the second hash table comprise hash values that are generated based on contents of physical memory pages; and
comparing each hash value, in the second hash table, corresponding to the first workload running on the second host computing system with the hash values in the first hash table using the master hash table.

22. The non-transitory computer-readable storage medium of claim 20, further comprises:
   propagating the hash values corresponding to the first workload to the first hash table residing in the first host computing system during migration of the identified first workload.

23. The non-transitory computer-readable storage medium of claim 20, further comprising:
   repeating the steps of comparing, identifying, and recommending for other workloads running on the second host computing system.

24. The non-transitory computer-readable storage medium of claim 20, wherein sharing the physical memory pages for the first workload on the first host computing system, comprises:
   mapping guest physical memory pages of the first workload to the physical memory pages associated with the matched hash values in the first host computing system.

25. The non-transitory computer-readable storage medium of claim 20, further comprising initiating the migration of the first workload to the first host computing system based on computing resources availability at the first host computing system.

26. The non-transitory computer-readable storage medium of claim 20, wherein identifying the first workload as accessing the physical memory pages having identical contents further comprises:
   performing, a byte-by-byte comparison of the physical memory pages associated with the matched hash values in the first hash table and the second hash table; and
   identifying the first workload as accessing the physical memory pages having identical contents based on outcome of the byte-by-byte comparison.

27. The non-transitory computer-readable storage medium of claim 20, further comprising:
   periodically generating the hash values by applying a hash function on the contents of the physical memory pages of the first host computing system and the second host computing system; and
   updating the hash values in a respective one of the first hash table and the second hash table.

28. The non-transitory computer-readable storage medium of claim 21, wherein periodically synchronizing the first hash table of the first host computing system and the second hash table of the second host computing system with the master hash table residing in the management server, comprises:
   periodically polling the first host computing system and the second host computing system to obtain the hash values stored in the first hash table and the second hash table using a connection; and
   periodically synchronizing the first hash table and the second hash table with the master hash table using the obtained hash values.

* * * * *